J. W. ELLIS.
METHOD FOR JOINTING METAL BARS.
APPLICATION FILED FEB. 6, 1914.
1,150,258.
Patented Aug. 17, 1915.
2 SHEETS—SHEET 2.
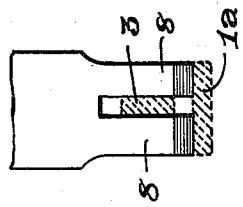
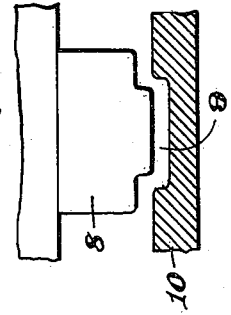
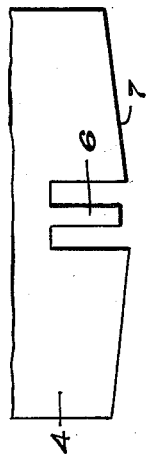
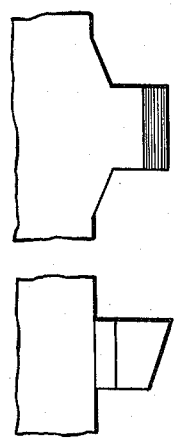

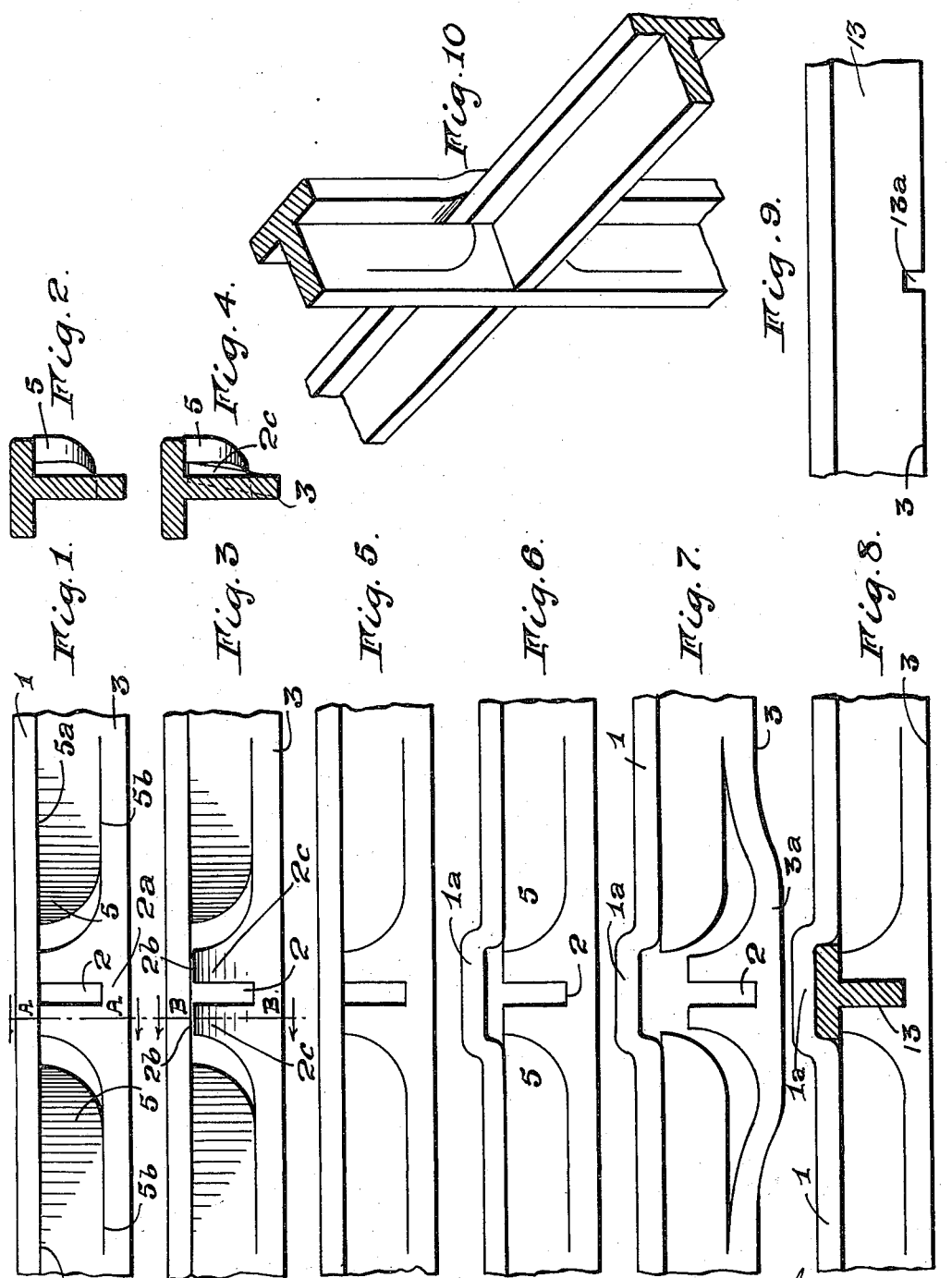

UNITED STATES PATENT OFFICE.

JOSEPH WILLIAM ELLIS, OF ELLESMERE PORT, ENGLAND.

METHOD FOR JOINTING METAL BARS.

1,150,258.  Specification of Letters Patent. Patented Aug. 17, 1915.

Application filed February 6, 1914. Serial No. 816,960.

*To all whom it may concern:*

Be it known that I, JOSEPH WILLIAM ELLIS, a subject of the King of Great Britain, and a resident of Ellesmere Port, Cheshire, England, have invented certain new and useful Improvements in the Method for Jointing Metal Bars, of which the following is a specification.

The present invention relates to an improved method for forming an intersecting joint between the metal sash bars of windows, whereby a more economical and efficient joint may be secured.

According to this invention the metal sash-bars, whether of T or the like section, are operated upon by suitable tools in order, primarily, to punch a slot in the side portions of the web of what may be termed the main bar; the metal at the top of the slot is then severed from the head member of the bar, the head and the slotted portion of the web being then opened out to enable the transverse bar to be inserted, the whole joint at the point of intersection being afterward consolidated.

The invention is illustrated in the accompanying drawings in which—

Figure 1. is a side view of a main bar after the first operation. Fig. 2. is a transverse section through the bar shown in Fig. 1. on the line A—A. Fig. 3. is a view analogous to Fig. 1. showing the second stage, and Fig. 4. is a cross section on the line B—B, Fig. 3. Figs. 5. 6. 7. and 8. are views showing the succeeding operations, and Fig. 9. is a detail showing notching of the transverse bar. Fig. 10. is a perspective view of a joint made in accordance with this invention. Fig. 11. is a view of a tool suitable for effecting the first operation on the bar, shown in Fig. 1. Fig. 11$^a$ illustrates a view of a tool suitable for effecting the cutting of the bars shown by Fig. 5. Figs. 12. and 13. are end and front views, respectively, of a tool suitable for effecting the second operation shown in Fig. 3. Figs. 14. and 15. are end and front views, respectively, of a tool suitable for effecting the opening out of the head of the sash-bar, as shown in Fig. 6., and Figs. 16. and 17. are front and end views, respectively, of a tool suitable for opening out the web of the sash-bar, as shown in Fig. 7.

In carrying out the invention, the metal sash-bars of usual plain T section, as shown in the drawings, or in which the head member 1 of the bar is ornamentally molded, are first operated upon by a suitable tool, such as that shown in Fig. 11. in order to punch a slot 2 in the web 3, such slot being disposed at right angles to the head member 1 of the bar and terminating, as shown, close beneath the head 1, but not extending to the extreme outer edge of the web 3, so that an integral part $2^a$ is left intact in the web. Simultaneously with this operation of punching the slot 2, the tool 4 is arranged to partially cut out portions 5 of the web of the sash-bar on each side of the slot 2. The slot 2 is punched by the central element 6 of the tool 4, and the side portions 5. of the web 3 are cut by the elements 7 of the tool. Such side portions will be depressed by the operation of the tool from the plane of the web, and cut along their upper edge $5^a$ adjoining the head member 1 of the bar, and along their lower edges $5^b$ approximately level with the base of the slot 2. The integral metal on each side at the top of the slot 2 is then cut at $2^b$, Fig. 3., leaving the metal of the web 3. completely separated from the head member 1 for some distance on each side of the slot 2. This operation is effected by means of a tool such as that shown in Figs. 12. and 13., and the portions $2^c$ of the metal on each side of the slot are also depressed from the plane of the web. These depressed portions 5 and $2^c$ of the web are then restored to their original plane in the web in any suitable manner, the sash-bar being then as shown in Fig. 5. In the next operation the head member 1 of the bar is set up from the web 3 in the region of the slot 2 by means of a tool such as that shown in Figs. 14. and 15., the tool being provided with forked arms 8 which pass down each side of the web of the reversed sash-bar, as shown by the dotted lines Fig. 15., and depress the part $1^a$ of the head member into the recess 9 of a die 10. The sash-bar is then in the form shown in Fig. 6. In the succeeding operation, the part $3^a$ of the web in the region of the slot 2 is then forced downward from the head member 1 to the position shown in Fig. 7. This action may be performed by a tool such as that shown in Figs. 16. and 17., the head element 11 of the tool entering the recess beneath the part $1^a$ of the sash-bar, and the web 12 of the tool entering the slot 2, the inclined face $12^a$ of the tool forcing down the lower part $3^a$ of the web to the position shown in Fig. 7. During this operation the web 3 and the bar are suitably held so as to prevent bending. The transverse sash-bar 13, Fig. 9., is then inserted into the widened aperture thus formed, and the bars at the intersecting joint consolidated in any suitable manner to the form shown in Fig. 8. The transverse bar 13, before being inserted into the widened aperture, is notched at 13$^a$ on the outer edge of its web, such notch registering over the integral part 2$^a$ of the web 3 below the slot 2 in the main sash-bar.

It is found that a sash-bar joint constructed in the manner described is extremely efficient and reliable.

I claim:—

A method of connecting metal sash bars having a head portion and a web portion, consisting in cutting a transverse notch in the web portion, and cutting a substantially curved slot in the web adjacent each side of the notch, the curved slots starting at a point adjacent the head extending into the web, and terminating in a portion substantially parallel with the lower edge of the web, separating a portion of the head from the web, inserting a metal bar in the notch, cutting a notch in the bar to be inserted, and finally forcing the severed portions of the slot into engagement with the remaining portion of the web.

In testimony whereof I affix my signature in presence of two witnesses.

JOSEPH WILLIAM ELLIS.

Witnesses:
A. J. DAVIES,
M. MITCHELL.

Copies of this patent may be obtained for five cents each, by addressing the "Commissioner of Patents, Washington, D. C."